Oct. 4, 1966    G. KERENSKY    3,276,461
CONTROL SYSTEMS FOR HYDRAULIC TURBINES
Filed June 19 1964    3 Sheets-Sheet 1

Oct. 4, 1966     G. KERENSKY     3,276,461
CONTROL SYSTEMS FOR HYDRAULIC TURBINES
Filed June 19 1964     3 Sheets-Sheet 2

United States Patent Office 3,276,461
Patented Oct. 4, 1966

3,276,461
CONTROL SYSTEMS FOR HYDRAULIC TURBINES
Gleb Kerensky, Netherton, England, assignor to The English Electric Company Limited, London, England, a British company
Filed June 19, 1964, Ser. No. 376,472
Claims priority, application Great Britain, June 24, 1963, 25,017/63
11 Claims. (Cl. 137—25)

This invention relates to control systems for hydraulic turbines.

According to this invention, a control system for a hydraulic turbine comprises a governor, flow control means controlling the flow of water to the turbine runner and controlled by the governor to reduce the flow on increase of speed sensed by the governor, and vice versa, and relief valve means dimensioned so that it is only capable of passing a small proportion of the total flow of water which can pass through the turbine runner when the flow control means is in the maximum flow position, and connected to the governor through dashpot means so as to move in the sense of opening at the beginning of a closing movement of the flow control means, or so as to move in the sense of closing at the beginning of an opening movement of the flow control means, the dashpot means collapsing after the relief valve means reaches its limiting position, so as to allow the flow control means to move further while the relief valve means remains in its limiting position.

Figure 1:
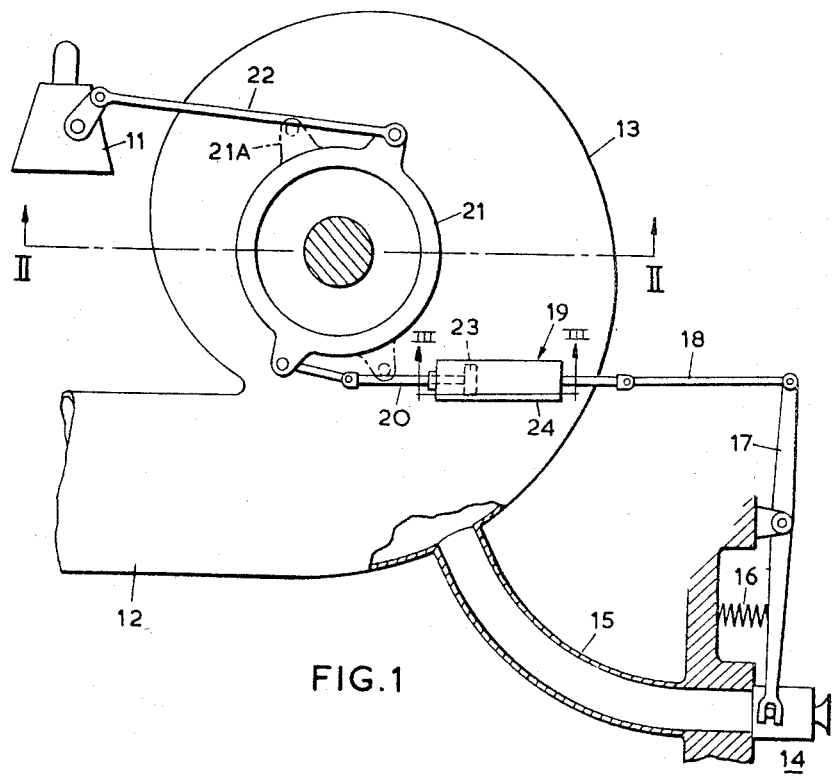
Figure 3:
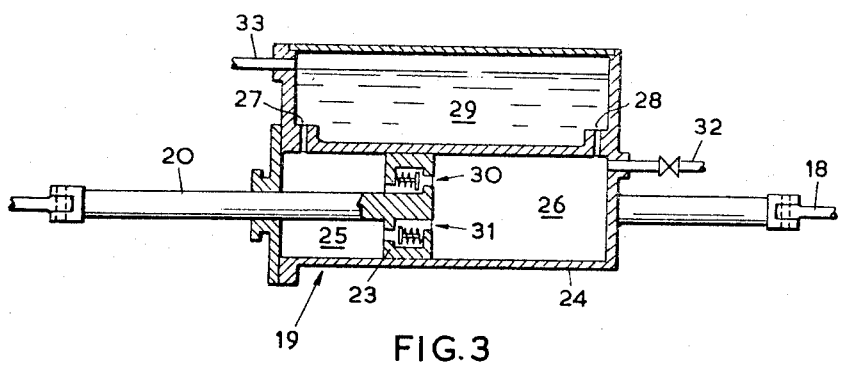
Figure 2:
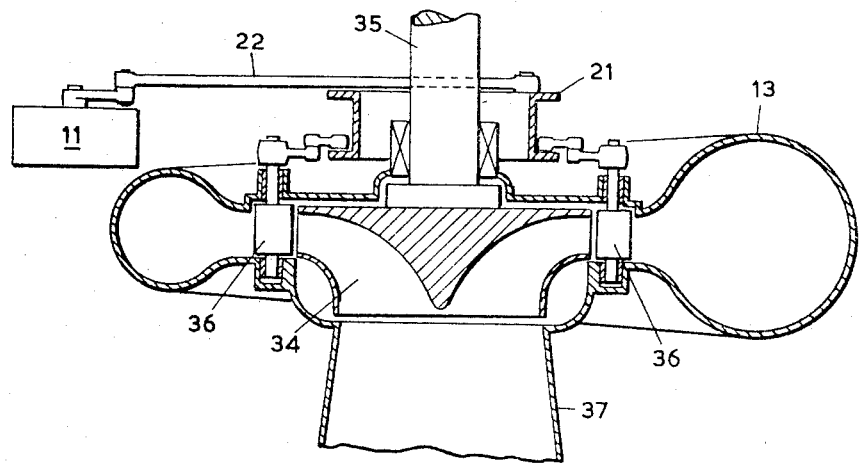
Figure 4:
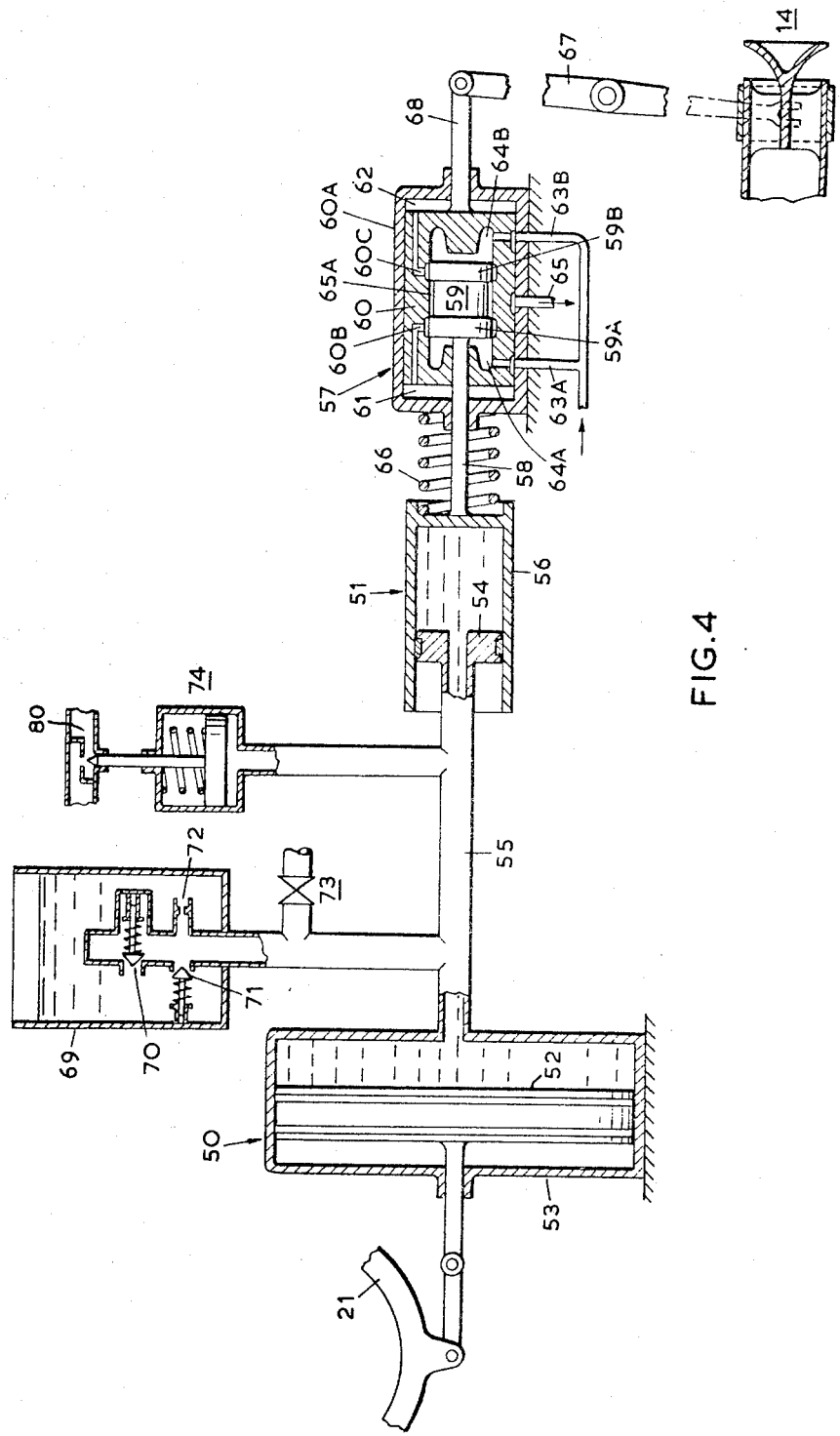

A number of embodiments of the invention will now be described by way of example with reference to the accompanying drawings of which:

FIG. 1 shows diagrammatically one embodiment of control system in accordance with the invention, FIG. 2 is a view on the line II—II of FIG. 1, FIG. 3 is a sectional view showing a detail of part of FIG. 1, FIG. 4 is a modification of the arrangement of FIGS. 1–3, and FIG. 5 is a detail view of part of FIG. 1.

Referring now to FIGS. 1, 2 and 3, the hydraulic turbine comprises a runner 34 connected to a shaft 35 which is mounted in suitable bearings in stationary structure. The runner 34 is usually connected to the rotor of an alternator (not shown) to drive it. The runner 34 is driven by water led from a source of water pressure through a penstock 12 to a spiral casing 13 surrounding the runner 34, from which the water passes through adjustable guide vanes 36 to the inlet of the runner 34 in well-known manner. After passing through the runner, the water is exhausted through a tail-pipe 37. The adjustable guide vanes 36 constitute flow control means.

The control system of the hydraulic turbine comprises a governor 11 responsive to the speed of rotation of the runner 34, and a relief valve 14, which controls the outlet of a duct 15 branched off the penstock 12, through which, when the relief valve 14 is open, water flows to the tailrace or other convenient point. The relief valve 14 is shown as a sleeve valve, movement to the left in the drawing opening the valve, and movement to the right closing it. The relief valve is also shown, in greater detail, in FIG. 4. The relief valve 14 is loaded in the sense of closing by a spring 16, shown diagrammatically acting on a pivoted lever 17 which is connected by a rod 18 through a dashpot 19 and a further rod 20 to the control ring 21 for the adjustable guide vanes 36 of the turbine runner. The control ring 21 is connected by a link 22 to the output member of the governor 11.

Referring now to FIG. 3, which is a sectional view on the line III—III of FIG. 1, the dashpot 19 comprises a piston 23, connected through the link 20 to the control ring 21, and a cylinder 24 connected through link 18 to the lever 17. The two ends, 25, 26 of the dashpot cylinder 24 are interconnected through restricted orifices 27, 28 and the interconnection may pass through an oil reservoir 29 as shown. The piston 23 is provided with spring-loaded relief valves 30, 31 which are normally closed, and it may have an external oil supply 32 and an overflow connection 33.

The relief valve 14 is dimensioned so that it is only capable of passing a small proportion, e.g. 10 percent, of the total flow of water which passes through the turbine runner 34 when the adjustable guide vanes 36 are fully open. The relief valve 14 is also so arranged that it remains stationary over the major part of the travel of the adjustable guide vanes 36, when these make a large movement, and the piston 23 of the dashpot 19 therefore moves relative to its cylinder 24. However, over a small part of the movement of the adjustable guide vanes 36, the relief valve 14 is able to move, in the sense of opening as the flow area of the adjustable guide vanes 36 is reduced (referred to as closing), and over this small part of the movement the dashpot 19 acts as a rigid link. Thus at the beginning of any closing movement of the adjustable guide vanes 36 the relief valve 14 moves in the sense of opening. The spring 16, which loads the relief valve 14 in the sense of closing, then causes it to close gradually, telescoping the dashpot 19. If an opening movement of the adjustable guide vanes 36 occurs before the relief valve 14 is fully closed, the dashpot 19 moves as a solid link and the relief valve 14 is closed more rapidly.

When an increase of speed of the turbine runner 34 is sensed by the governor 11, the latter moves the control ring 21 in the anti-clockwise sense (as seen in FIG. 1) so as to move the adjustable guide vanes 36 in the sense of closing. The extreme position is shown chain-dashed at 21A. However, owing to the characteristics of the column of water in the penstock 12, this initial closing movement of the adjustable guide vanes 36 increases the pressure in the penstock 12, which in turn tends to cause the speed of the runner 34 to be increased rather than decreased, over a period of several seconds, in spite of the partial closing of the adjustable guide vanes 36. This phenomenon would cause the governing system to be unstable and it is therefore usual for movement of the governor 11 to be heavily damped so that its movements begin slowly and speed up only as considered to be permissible to suit the pipeline characteristics.

The relief valve 14 of the present invention, by opening as the adjustable guide vanes 36 are moved in the closing sense from their fully-open position, reduces the pressure in the penstock 12, and enables the speed of the runner to be governed more accurately, and since this happens on the commencement of the movement, it also reduces the need for damping between the governor 11 and the adjustable guide vanes 36.

It will be appreciated that at the beginning of a movement of the adjustable guide vanes 36, the relief valve 14 compensates for increase in the pressure rise in the penstock 12 as fully as would the conventional large relief valve (i.e. a relief valve which is capable of passing a large proportion, e.g. over 50 percent of the total flow of water which passes through the turbine when the adjustable guide vanes are fully open) although in fact it is a small valve, since, over the opening range of the relief valve, the rate of increase of area may be made the same as in the large valve. This makes it possible without excessive waste of water to choose a rate of self-reclosure for the relief valve 14 (under the influence of the spring 16, and as the dashpot 19 collapses), which, in terms of its effect on the pipeline connected to penstock 12 may be between 10 and 100 times slower than with the conventional large relief valve, by making the rigidity of the dashpot 19 correspondingly greater (e.g. by making the restricted orifices 27, 28 smaller). This, in turn, means that correspondingly slower movements of the governor 11 can cause movement of the relief valve 14, whereas in the known forms of relief valve the effect on the relief valve of slow movements of the governor is nullified by the collapsing action of the dashpot connection. The relief valve 14 of the present invention operates almost exclusively in that portion of the governor movement which is normally damped, whereas conventional large relief valves operate principally in that portion of the governor movement in which little damping is present, and are not affected by any movements which are confined to the damped zone of governor action.

Instead of the relief valve 14 having an opening movement from its normal fully-closed position when the adjustable guide vanes 36 are moved in the sense of closing, it may be normally fully open and arranged to close as the adjustable guide vanes 36 are moved from a position near to their fully-open position in the opening sense. In another alternative the relief valve 14 may normally be partially open, and may be arranged to close as the adjustable guide vanes 36 are moved in the opening sense and vice versa.

In the preferred form, the relief valve 14 is normally closed, and is spring-loaded by spring 16 in the sense of closing. When the control ring 21 moves in an anticlockwise sense as seen in FIG. 1, causing the adjustable guide vanes 36 to be moved in the sense of closing, the piston 23 of dashpot device 19 is moved to the right (in FIGS. 1 and 3) and the cylinder 24 moves solidly with the piston 23, causing the relief valve 14 to open, through lever 17. When the relief valve 14 reaches the fully-open position—and the travel of relief valve 14 corresponds to only a small proportion, e.g. 10 percent, of the travel of the adjustable guide vanes 36—the piston 23 of the dashpot device 19 over-runs the cylinder 24, and a relief valve 30 (FIG. 3) opens, allowing oil to flow from the space 26 on the right-hand side to the space 25 on the left-hand side of the piston 23, so that movement of the adjustable guide vanes 36 may continue under control of the governor 11. The relief valve 14 is loaded by spring 16 which slowly resets it in its closed position, the resetting action being accompanied by telescoping of the piston 23 and cylinder 24 of the dashpot device 19, the cylinder 24 moving to the left as shown in FIGS. 1 and 3, and oil flowing from the space 26 on the right-hand side of the piston 23 through restrictors 28, 27 to the space 25 on its left-hand side.

When the relief valve 14 is arranged to be normally open, and to move in the closing direction to achieve its controlling action as the adjustable guide vanes 36 move in the opening sense, the dashpot device 19 will move as a unit to the left as shown in FIGS. 1 and 3 during the controlling action, rocking the lever 17 and causing the relief valve 14 to move to the right in the closing sense. When the relief valve 14 reaches its fully-closed position, further movement of the cylinder 24 to the left is prevented and the piston 23 moves to the left, the cylinder 24 remaining stationary, oil being vented from the space 25 on the left-hand side to the space 26 on the right-hand side of the piston 23 through the relief valve 31. In this case the valve 14 is spring-loaded towards its open position (for example by positioning spring 16 on the side of the pivot remote from the relief valve 14), and resetting of the relief valve 14 to its open position, under the influence of this spring, is accompanied by movement of the dashpot cylinder 24 to the right, oil passing from the space 25 on the left-hand side of the piston 23 through restrictors 27, 28 into the space 26 on the right-hand side of the piston.

When the governor 11 in this arrangement operates the control ring 21 to move the adjustable guide vanes 36 to their fully-closed position, the dashpot device 19 will telescope since the relief valve 14 cannot move further in this sense than its fully-open position.

Referring now to FIG. 4, there is shown an arrangement in which the magnification of the travel of the relief valve 14, as compared with the travel of the control ring 21, is achieved by hydraulic means rather than by a mechanical linkage. The hydraulic means includes a piston and cylinder device 50 connected to another similar device 51; however the effective area of the piston 52 of device 50 is much larger, e.g. 10 times larger than the effective area of device 51. The piston 52 of device 50 is connected to the control ring 21, or direct to the governor 11, so that its movement is substantially proportional to movement of the adjustable guide vanes 36. The cylinder 53 of device 50 is fixed, as is the piston 54 of device 51, and the two are interconnected by a duct 55. The cylinder 56 of device 51 is movable, and it will be seen that its linear movement will be magnified in the ratio of the areas; for example where the area of piston 52 is ten times that of piston 54 one unit of linear movement of piston 52 will produce ten units of linear movement of cylinder 56.

The cylinder 56 is connected to operate the relief valve 14, either directly or through a servomotor 57, which may be as described in relation to FIG. 3 of our co-pending applications Nos. 6,865/59 and 16,041/59 (cognate).

In this case, a rod 58 connected to cylinder 56 has its other end connected to a pilot valve 59 slidably mounted within a servopiston 60 in a fixed cylinder 60A. The pilot valve 59 has two lands 59A, 59B co-operating with ports 60B, 60C which communicate respectively with the cylinder spaces 61, 62 on each side of the servo-piston 60. Pressure fluid connections 63A, 63B are made to the spaces 64A, 64B on either side of the pilot valve 59, and a drain connection 65 to the space 65A between the two lands. Movement of the servo-piston 60 therefore follows movement of the pilot valve 59, and the servo-piston 60 has a rod 68 connected to it to operate the relief valve 14 through lever 67 which is shown as being pivotally mounted midway along its length. The movable cylinder 56 is spring-loaded by spring 66 (corresponding to spring 16 of FIG. 1), tending to cause the relief valve 14 to move towards the closed position.

The duct 55 which connects the cylinder 53 of the device 50 with the piston-and-cylinder device 51 is connected with a reservoir 69 through a non-return valve 70 which ensures that the duct 55 is maintained full of oil. There is also provided a spring-loaded pressure relief valve 71, through which oil may pass from the duct 55 to the reservoir 69, and a restricted orifice 72 communicating between the duct and the reservoir.

The duct 55 may also be connected to a supply of oil under pressure through a control valve 73, e.g. to permit manual operation of the relief valve 14.

A device may also be provided as shown at 74 to interlink the relief valve control system with that of the turbine governor as described below.

In operation, when the governor 11 senses an increase of speed of the turbine, it moves the control ring 21 in the sense to close the adjustable guide vanes 36 and causes the piston 52 to move to the right as shown in FIG. 4. The liquid in the cylinder 53 is thus forced along the duct 55 into the cylinder 56 of the piston-and-cylinder device 51. Since the piston 54 of this device is fixed, the cylinder 56 moves to the right, its travel being substantially greater than the travel of the piston 52 operated by the governor 11, by reason of the multiplying action of the arrangement, as described above. Thus the travel of the relief valve 14 is also substantially greater, e.g. 10 times, the travel of the control ring 21, for that limited part of the travel of the control ring 21 in which the relief valve 14 is not at the end of its travel. Movement of the cylinder 56 is transmitted through rod 58 either directly to relief valve 14, or through the servo-motor 57 as shown. In the arrangement shown, the relief valve 14 is normally closed and is moved in the opening sense by movement of rod 58 to the right as shown in the drawing. The travel of the relief valve 14 is of limited extent, and accordingly when it reaches the fully-open position no further movement of cylinder 56 is possible. Relief valve 71 then opens as a result of the pressure rise in the duct 55 and the pressure is vented to tank 69. The action of spring 66 tends to restore the relief valve 14 to the closed position, moving the cylinder 56 of device 51 to the left, the movement being controlled by the escape of oil through orifice 72.

In the arrangement in which the relief valve 14 is arranged to be normally-open, its controlling action occurs when the governor 11 moves piston 52 to the left, so as also to move the adjustable guide vanes 36 in the sense of opening. The cylinder 56 of device 51 will then tend to move to the left, so as to close the relief valve 14. In this case the spring 66 will be replaced by a spring urging the cylinder 56 of device 51 to the right, so as to reset the relief valve 14 in the open position, oil flowing from the reservoir 69 through restrictor 72 into the duct 55 during this process.

Figure 5:
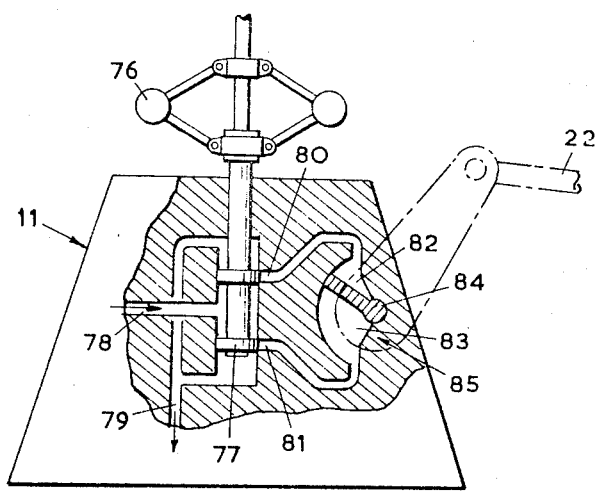

As shown in FIG. 5, the governor 11 comprises a speed-sensitive device 76 which operates a shuttle valve 77 to connect pressure supply and drain connections 78, 79 to two pipelines 80, 81 which are connected to spaces 82, 83 on opposite sides of the piston 84 of a servomotor 85 which is connected to operate rod 22. Increase of speed connects the pressure supply 78 to the space on one side of the servomotor piston 84 to move the adjustable guide vanes 36 in the closing sense, and connects the space 83 on other side to drain, and decrease of speed has the opposite effect.

The device shown at 74 restricts one of the pipelines, e.g. pipeline 80, between the shuttle valve 77 and the servomotor 85, in order to damp movement of the servomotor piston 84, when the relief valve 14 has reached the end of its travel and the pressure in duct 55 is therefore increased, causing the piston of device 74 to lift. When the relief valve 14 is moving, the device 74 does not restrict the pipeline.

What I claim as my invention and desire to secure by Letters Patent is:

1. A control system for a hydraulic turbine comprising a governor, flow control means controlling the flow of water to the turbine runner and controlled by said governor to change the flow corresponding to a change of speed sensed by said governor, and relief valve means dimensioned so that it is only capable of passing a small proportion of the total flow of water which can pass through the turbine runner when said flow control means is in the maximum flow position, said relief valve means connected to said governor through dashpot means to move in the sense of opening at the beginning of a closing movement of said flow control means, and to move in the sense of closing at the beginning of an opening movement of said flow control means, said dashpot means collapsing after said relief valve means reaches its limiting position, so as to allow said flow control means to continue to move further while said relief valve means remains in its limiting position.

2. A control system as claimed in claim 1, wherein said relief valve means is connected to said governor through a mechanical linkage incorporating said dashpot means.

3. A control system as claimed in claim 2, wherein said relief valve means moves in the sense of opening said relief valve means at the beginning of a closing movement of said flow control means, and including resilient means arranged to load said relief valve means in the sense of closing said relief valve means.

4. A control system as claimed in claim 2, wherein said relief valve means moves in the sense of closing said relief valve means at the beginning of an opening movement of said flow control means from a position near the fully-open position, and including resilient means loading said relief valve means in the sense of opening.

5. A control system as claimed in claim 2, wherein said relief valve means moves in the sense of closing said relief valve means as said flow control means moves in the opening sense, and moves in the sense of opening as said flow control means moves in the closing sense, and including resilient means arranged to load said relief valve means towards a predetermined partially-open position.

6. A control system as claimed in claim 1, wherein said relief valve means is connected to said governor through hydraulic means so that movement of said relief valve is magnified in relation to said movement of said flow control means.

7. A control system as claimed in claim 6, wherein said hydraulic means comprises a first piston-and-cylinder device having one element connected to move with said flow control means, and a second piston-and-cylinder device having one element connected to move with said relief valve, said piston-and-cylinder devices having different effective areas and being hydraulically interconnected.

8. A control system as claimed in claim 7, wherein said relief valve means moves in the sense of opening said relief valve means at the beginning of a closing movement of said flow control means, and including resilient means arranged to load said relief valve means in the sense of closing said relief valve means, and including relief valve means to vent said hydraulic interconnection between said first and second piston-and-cylinder devices when said relief valve means reaches its limiting position.

9. A control system as claimed in claim 7, wherein said relief valve means moves in the sense of closing said relief valve means at the beginning of an opening movement of said flow control means from a position near the fully-open position, and including resilient means loading said relief valve means in the sense of opening said relief valve means, and including a restricted communication between a hydraulic fluid reservoir and said hydraulic interconnection between said first and second piston-and-cylinder devices.

10. A control system as claimed in claim 7, wherein said relief valve means moves in the sense of closing said relief valve means as said flow control means moves in the opening sense and said relief valve means moves in the sense of opening as said flow control means moves in the closing sense, and including resilient means loading said relief valve towards a predetermined partially-open position.

11. A control system as claimed in claim 7 wherein said governor comprises a servo-motor connected to said flow control means, and wherein said hydraulic interconnection between said first and second piston-and-cylinder devices is connected to a restricting device so that, as the pressure in said hydraulic interconnection increases when said relief valve means reaches its limiting position, said restricting device moves to damp movement of said servo-motor in said governor.

References Cited by the Examiner

UNITED STATES PATENTS

| | | | |
|---|---|---|---|
| 1,109,153 | 9/1914 | Sundby | 253—24 |
| 1,202,310 | 10/1916 | Pfau | 137—25 |
| 1,309,808 | 7/1919 | Pfau | 137—25 |
| 1,706,812 | 3/1929 | Pfau | 253—24 |
| 2,681,660 | 6/1954 | Avery | 137—25 |
| 2,938,527 | 5/1960 | Nichols | 137—25 |
| 3,051,186 | 8/1962 | Fisch | 137—25 |
| 3,063,460 | 11/1962 | Krauss | 137—25 |

WILLIAM F. O'DEA, *Primary Examiner.*

CLARENCE R. GORDON, *Examiner.*